United States Patent
Wing et al.

(10) Patent No.: US 7,706,278 B2
(45) Date of Patent: *Apr. 27, 2010

(54) TRIGGERING FLOW ANALYSIS AT INTERMEDIARY DEVICES

(75) Inventors: Daniel G. Wing, San Jose, CA (US); Robert J. Biskner, Santa Barbara, CA (US); Rajesh Kumar, Palo Alto, CA (US); Mohamed S. Mostafa, Emerald Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/626,819

(22) Filed: Jan. 24, 2007

(65) Prior Publication Data

US 2008/0175162 A1 Jul. 24, 2008

(51) Int. Cl.
- H04J 3/14 (2006.01)
- H04L 1/00 (2006.01)
- H04L 12/26 (2006.01)
- H04L 12/56 (2006.01)

(52) U.S. Cl. .................. 370/236; 370/242; 370/389; 370/252

(58) Field of Classification Search ......... 370/389, 370/241, 242, 252

See application file for complete search history.

(56) References Cited

U.S. PATENT DOCUMENTS

| | | | |
|---|---|---|---|
| 4,006,320 A | 2/1977 | Markl | |
| 4,486,877 A | 12/1984 | Turner | |
| 4,569,042 A | 2/1986 | Larson | |
| 4,630,268 A | 12/1986 | Rodenbaugh | |
| 4,907,277 A | 3/1990 | Callens et al. | |
| 5,010,544 A | 4/1991 | Chang et al. | |
| 5,014,265 A | 5/1991 | Hahne et al. | |
| 5,121,382 A | 6/1992 | Yang et al. | |
| 5,159,592 A | 10/1992 | Perkins | |
| 5,243,342 A | 9/1993 | Kattemalalavadi et al. | |
| 5,274,643 A | 12/1993 | Fisk | |
| 5,343,461 A | 8/1994 | Barton et al. | |
| 5,353,283 A | 10/1994 | Tsuchiya | |
| 5,371,852 A | 12/1994 | Attanasio et al. | |
| 5,394,402 A | 2/1995 | Ross | |
| 5,416,842 A | 5/1995 | Aziz | |
| 5,422,876 A | 6/1995 | Turudic | |
| 5,426,637 A | 6/1995 | Derby et al. | |
| 5,430,715 A | 7/1995 | Corbalis et al. | |
| 5,450,449 A | 9/1995 | Kroon | |

(Continued)

OTHER PUBLICATIONS

Rosenberg et al., IETF RFC 3489, Mar. 2003.*

(Continued)

*Primary Examiner*—Seema S Rao
*Assistant Examiner*—Jianye Wu
(74) *Attorney, Agent, or Firm*—Stolowitz Ford Cowger LLP

(57) ABSTRACT

In one embodiment, a router examines an incoming packet for a flow monitoring request. The router may examine every packet for the flow monitoring request, or preferably may only examine packets including a lifetime value indicating that the packet should be dropped and not forwarded or may only examine packets having a predetermined message format. When the flow monitoring request is included, the router performs detailed flow analysis or other monitoring according to the flow monitoring request.

21 Claims, 2 Drawing Sheets

U.S. PATENT DOCUMENTS

| | | |
|---|---|---|
| 5,452,294 A | 9/1995 | Natarajan |
| 5,473,599 A | 12/1995 | Li et al. |
| 5,491,692 A | 2/1996 | Gunner et al. |
| 5,500,851 A | 3/1996 | Kozaki et al. |
| 5,500,860 A | 3/1996 | Perlman et al. |
| 5,519,704 A | 5/1996 | Farinacci et al. |
| 5,555,256 A | 9/1996 | Calamvokis |
| 5,561,669 A | 10/1996 | Lenny et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vantuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,884,010 A | 3/1999 | Chen et al. |
| 5,918,019 A | 6/1999 | Valencia |
| 5,931,961 A | 8/1999 | Ranganathan et al. |
| 5,943,347 A | 8/1999 | Shepard |
| 6,023,455 A | 2/2000 | Takahashi |
| 6,032,194 A | 2/2000 | Gai et al. |
| 6,061,454 A | 5/2000 | Malik et al. |
| 6,104,695 A | 8/2000 | Wesley et al. |
| 6,118,796 A | 9/2000 | Best et al. |
| 6,192,036 B1 | 2/2001 | Buhler et al. |
| 6,230,271 B1 | 5/2001 | Wadlow et al. |
| 6,275,471 B1 | 8/2001 | Bushmitch et al. |
| 6,337,861 B1 | 1/2002 | Rosen |
| 6,356,545 B1 | 3/2002 | Vargo et al. |
| 6,389,006 B1 | 5/2002 | Bialik |
| 6,445,717 B1 | 9/2002 | Gibson et al. |
| 6,515,967 B1 | 2/2003 | Wei et al. |
| 6,526,044 B1 | 2/2003 | Cookmeyer, II et al. |
| 6,584,438 B1 | 6/2003 | Manjunath et al. |
| 6,614,781 B1 | 9/2003 | Elliott et al. |
| 6,665,637 B2 | 12/2003 | Bruhn |
| 6,687,225 B1 | 2/2004 | Kawarai et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,944,132 B1 | 9/2005 | Aono et al. |
| 6,947,381 B2 | 9/2005 | Wen et al. |
| 7,013,267 B1 | 3/2006 | Huart et al. |
| 7,039,716 B1 | 5/2006 | Jagadeesan |
| 7,047,190 B1 | 5/2006 | Kapilow |
| 7,068,607 B2 | 6/2006 | Partain et al. |
| 7,072,968 B2 | 7/2006 | Mikami et al. |
| 7,099,820 B1 | 8/2006 | Huart et al. |
| 7,212,517 B2 | 5/2007 | Dzik |
| 7,286,467 B1 | 10/2007 | Sylvain |
| 7,310,334 B1 | 12/2007 | FitzGerald et al. |
| 7,336,620 B2 | 2/2008 | Bennett |
| 7,352,705 B1 | 4/2008 | Adhikari et al. |
| 2002/0003775 A1 | 1/2002 | Nakano et al. |
| 2002/0067693 A1 | 6/2002 | Kodialam et al. |
| 2002/0083186 A1 | 6/2002 | Stringer |
| 2003/0053419 A1 | 3/2003 | Kanazawa et al. |
| 2003/0072269 A1 | 4/2003 | Teruhi et al. |
| 2003/0097438 A1 | 5/2003 | Bearden et al. |
| 2003/0110276 A1 | 6/2003 | Riddle |
| 2003/0163772 A1 | 8/2003 | Jaworski |
| 2003/0165114 A1 | 9/2003 | Kusama et al. |
| 2003/0208616 A1 | 11/2003 | Laing et al. |
| 2003/0219022 A1 | 11/2003 | Dillon et al. |
| 2003/0220971 A1 | 11/2003 | Kressin |
| 2004/0008715 A1 | 1/2004 | Barrack et al. |
| 2004/0052257 A1* | 3/2004 | Abdo et al. ............. 370/392 |
| 2004/0073690 A1 | 4/2004 | Hepworth et al. |
| 2004/0125965 A1 | 7/2004 | Alberth et al. |
| 2004/0170163 A1 | 9/2004 | Yik et al. |
| 2004/0193709 A1 | 9/2004 | Selvaggi et al. |
| 2004/0218617 A1 | 11/2004 | Sagfors |
| 2004/0223458 A1 | 11/2004 | Gentle |
| 2004/0240431 A1 | 12/2004 | Makowski et al. |
| 2004/0252646 A1 | 12/2004 | Adhikari et al. |
| 2005/0036519 A1 | 2/2005 | Balakrishnan et al. |
| 2005/0117576 A1 | 6/2005 | McDysan et al. |
| 2005/0226172 A1 | 10/2005 | Richardson |
| 2005/0243733 A1* | 11/2005 | Crawford et al. ............. 370/252 |
| 2005/0246041 A1 | 11/2005 | Kreifeldt et al. |
| 2005/0283639 A1* | 12/2005 | Le Pennec et al. ............. 714/4 |
| 2006/0041431 A1 | 2/2006 | Maes |
| 2006/0098586 A1 | 5/2006 | Farrell et al. |
| 2006/0112400 A1 | 5/2006 | Zhang et al. |
| 2006/0122835 A1 | 6/2006 | Huart et al. |
| 2006/0215684 A1* | 9/2006 | Capone ............. 370/437 |
| 2006/0268742 A1* | 11/2006 | Chu et al. ............. 370/254 |
| 2006/0274760 A1 | 12/2006 | Loher |
| 2007/0064616 A1* | 3/2007 | Miranda et al. ............. 370/250 |
| 2007/0107034 A1 | 5/2007 | Gotwals |
| 2007/0153774 A1 | 7/2007 | Shay et al. |
| 2007/0171835 A1* | 7/2007 | Gobara et al. ............. 370/248 |
| 2007/0212065 A1 | 9/2007 | Shin et al. |
| 2007/0286165 A1 | 12/2007 | Chu et al. |

OTHER PUBLICATIONS

Andreasen, et al., RTP No-Op Payload Format, Internet-Draft, Feb. 2004, pp. 1-8, Internet Engineering Task Force.

Rosenberg, et al., STUN—Simple Traversal of User Datagram Protocol (UDP) Through Network Address Translators (NATs), RFC 3489, Mar. 2003, pp. 1-44, Network Working Group.

Rosen et al., "MPLS Label Stack Encoding", RFC 3032, Jan. 2001.

Information Sciences Institute, University of Southern California, "Internet Protocal Darpa Internet Program Protocol Specification", Sep. 1981, pp. 1-49.

Information Sciences Institute, University of Southern California, "Internet Protocal Darpa Internet Program Protocol Specification", Sep. 1981, pp. 1-88.

Information Sciences Institute, University of Southern California, R. Braden, Internet Engineering Task Force, "Requirements for Internet Hosts—Communication Layers", Oct. 1989, pp. 1-115.

H. Schulzrinne, et al., RTP: A Transport Protocol for Real-Time Applications, RFC3550, Network Working Group, Jul. 2003, 98 pages.

H. Schulzrinne and GMD Fokus, "RTP Profile for Audio and Video Conferences with Minimal Control", Jan. 1996, pp. 1-17.

M. Handley and V. Jacobson, "SDP: Session Description Protocol", Apr. 1998, pp. 1-40.

H. Schulzrinne, GMD Fokus S. Casner, R. Frederick, and V. Jacobson, "RTP: A Transport Protocol for Real-Time Applications", Jan. 1996, pp. 1-71.

Webpage http://www.cis.ohio-state.edu/~cliu/ipmultimedia/ entitled "Multimedia Over IP: RSVP, RTP, RTCP, RTSP", Jan. 8, 2002, pp. 1-27.

Townsley, et al.Layer Two Tunneling Protocol "L2TP", RFC 2661, Network Working Group, Aug. 1999, 75 pages.

Prosecution History for U.S. Appl. No. 10/723,118, filed Nov. 26, 2003.

Prosecution History for U.S. Appl. No. 11/614,843, filed Dec. 21, 2006.

Niccolini et al., "How to store traceroute measurements and related metrics", October 24, 2005, 49 pages.

Jennings, "NAT Classification Test Results", Jun. 25, 2006, 17 pgs.

International Preliminary Report on Patentability and Written Opinion of ISA for PCT/US2004/039431; mailed Jun. 14, 2009; ISA/US.

International Search Report for PCT/US2004/039431; mailed Jun. 14, 2009; ISA/US.

International Preliminary Report on Patentability and Written Opinion of ISA for PCT/US2007/069567; mailed Aug. 12, 2008.

International Search Report for PCT/US2007/69567; mailed Aug. 12, 2008; ISA/US.

D. Mathieson, C. Kalbfleisch, S. Hunt and K. Low, "High Speed Serial Communications for Control Systems," IEEE, pp. 1826-1828.

R. Ullmann, "Rap: Internet Route Access Protocol," Internet Community's Request for Comments No. 1476, (Jun. 1993).

P Newman et al., "Ipsilon Flow Management Protocol Specification for Ipv4 Version 1.0," Internet Community's Request for Comments No. 1953 (May 1996).

M. Perez et al.. "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

M. Laubach, "Classical IP and ARP over ATM," Internet Community's Request for Comments No. 1577, (Jan. 1994).

M. McGovern, et al., "CATNIP: Common Architecture for the Internet," Internet community's Request for Comments No. 1707, (Oct. 1994).

S. Deering, et al., "Internet Protocol, Version 6," Internet Community's Request for Comments No. 1883, (Dec. 1995).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route-Based IP Switching," Internet Draft, (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft, (Mar. 1997).

"ISDN Data Link Layer Specification for Frame Mode Bearer Services." CCITT Recommendation Q.922, International Telecommunication Union, Geneva, 1992.

G. P. Chandranmenon and G. Varghese, "Trading Packet Headers for packet Processing," Proc. ACM SIGCOMM '95, Boston, MA, Sep. 1995, pp. 162-173.

Callon et al., "A Framework for Multiprotocol Label Switching," IETF Network Working Group Internet Draft draft-ietf-mpls-framework-02.txt, Nov. 21, 1997.

Rosen et al., "A proposed Architecture for MPLS," IETF Network Working Group Internet Draft draft-ietf-mpls-arch-00.txt, Aug. 1997.

Woundy et al., "ARIS Aggregate Route-Based IP Switching," Internet Draft draft-woundy-aris-ipswitching-00.txt, Nov. 1996.

Kalyaranaman et al.. "Performance and Buffering Requirements of Internet Protocols over ATM ABR and UBR Services," IEEE Communications magazine, vol. 36, No. 6, Jun. 1998.

Liao et al., "Adaptive recovery techniques for real-time audio streams," IEEE INFOCOM 2001. Twentieth Annual Joint Conference of the IEE Computer and Communications Societies Proceedings Apr. 22-26, 2001, vol. 2, pp. 815-823.

SFC Listing of Related Cases for 2705-0599. Oct. 26, 2009.

* cited by examiner

TRIGGERING FLOW ANALYSIS AT INTERMEDIARY DEVICES

TECHNICAL FIELD

The present disclosure relates generally to the field of networking.

BACKGROUND

A connection established between two endpoints over a packet switched network can experience packet loss when an on-path intermediary device is overloaded or for many other reasons. When the packet loss rises to a certain threshold, the root cause of the unacceptable packet loss needs to be identified in order to reduce the packet loss back to acceptable levels. Generally, the root cause can be identified after monitoring results from each intermediary device are complied and analyzed.

Network Management Systems (NMSs) or other higher level devices generally control the triggering of monitoring by the intermediary devices. However, these NMSs are not always aware of packet loss observed by one of the calling endpoints. Accordingly, the packet loss or other problem observed by the calling endpoint is often not resolved at all, or not resolved until the NMS observes the packet loss some time after the observation by one of the calling endpoints. The disclosure that follows solves this and other problems.

DESCRIPTION OF EXAMPLE EMBODIMENTS

Overview

Figure 1:
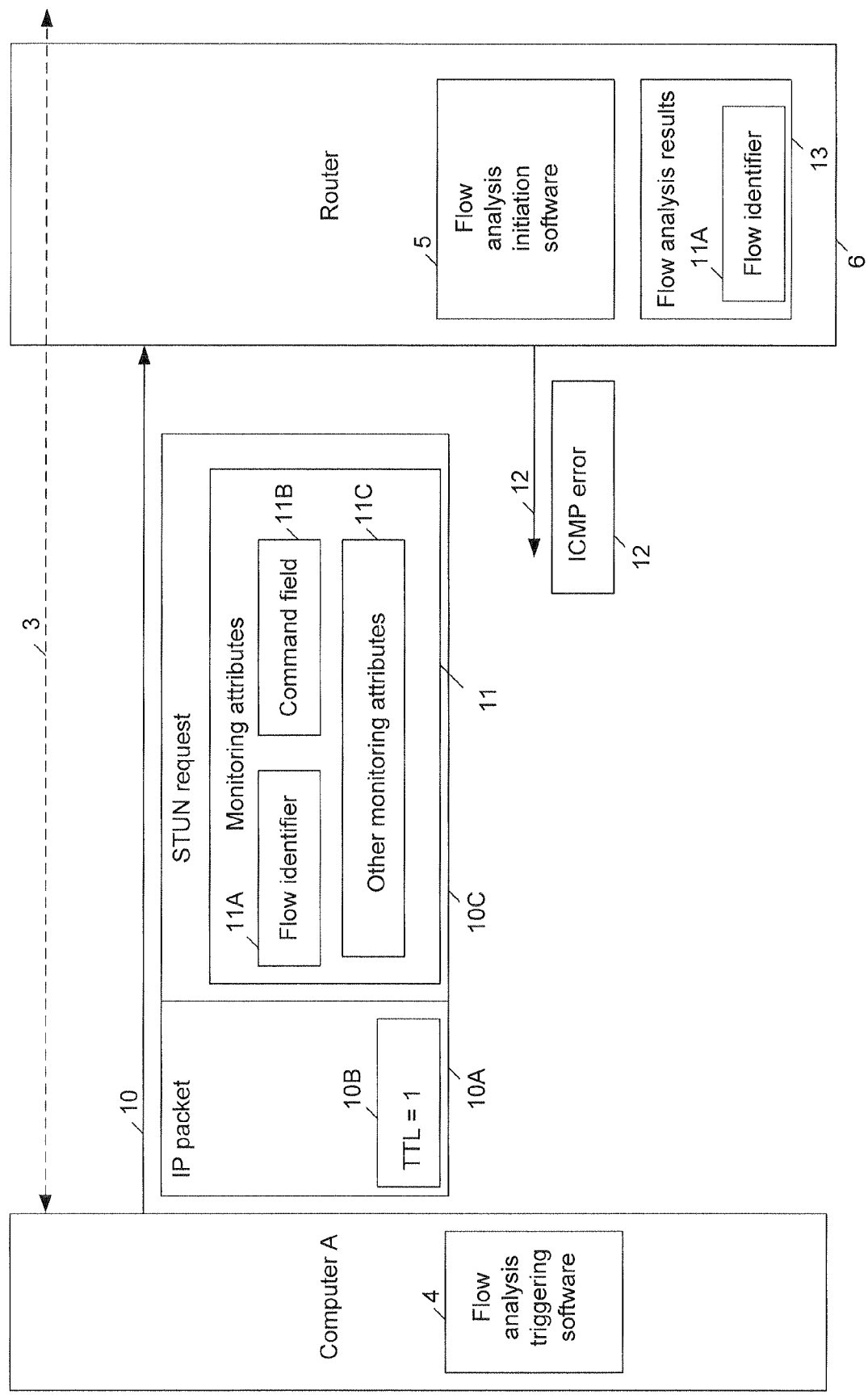
FIG. 1 illustrates an example computer for triggering a router to analyze a call flow that extends through the router.

In one embodiment, a router examines an incoming packet for a flow monitoring request. The router may examine every packet for the flow monitoring request, or preferably may only examine packets including a lifetime value indicating that the packet should be dropped and not forwarded or may only examine packets having a predetermined message format. When the flow monitoring request is included, the router performs detailed flow analysis or other monitoring according to the flow monitoring request.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

Co-pending patent application Ser. No. 11/614,843, which is herein incorporated by reference in its entirety, describes a technique for an endpoint to traceroute a call using one or more Simple Traversal of User Datagram Protocol (UDP) Through Network Address Translators (NATs) (STUN) messages. Briefly, an endpoint sends STUN messages with monotonically increasing Time To Live (TTL) values to identify one or more intermediary devices such as routers that are located on the call path. The STUN messages elicit both error responses from the intermediary devices and a STUN response from the remote endpoint that can be used to identify the intermediary devices located on the call path.

An embodiment of the present application leverages this technique by inserting an additional attribute into these STUN messages. An on-path router examines incoming packets for this additional attribute whenever the TTL value for the incoming packet is decremented to zero. Packets having decremented TTL values greater than zero are preferably not examined for the requests, but other embodiments may examine packets for the request regardless of TTL values. Observation of the request included within the traceroute message triggers flow analysis or other monitoring at those intermediary devices according to the request.

FIG. 1 illustrates an example computer for triggering a router to analyze a call flow that extends through the router.

Referring to FIG. 1, a connection 3 for media exchange between computers A and a remote endpoint (not shown) is established using Interactive Connectivity Establishment (ICE) or a similar protocol. The connection 3 includes a path extending through the router 6. Typically, the path also extends through N other routers; however, for brevity these other routers are not shown. Also, the connection 3 may include more than one path.

The computer A is generally unaware of the path that the connection 3 takes through the network. To identify the path that the connection 3 takes through the network, as well as for diagnostic reasons, computer A traceroutes the path. In the present example, the computer A uses STUN to traceroute the call path and identify the router 6. When STUN is used to traceroute the call path, the traceroute may occur after ICE, or during ICE by leveraging one of the STUN messages sent during ICE. Other protocols may be used for the traceroute messages, such as the Real Time Protocol (RTP).

The traceroute process involves generating a plurality of messages having monotonically increasing lifetime values. An example of a message generated for the traceroute that uses STUN is shown. The generated message 10 includes both an IP packet 10A with a TTL field 10B and a STUN request 10C. The TTL field 10B includes the value one, which indicates that this generated message 10 will identify the router 6 that conducts the first hop on the call path. More messages similar to message 10 are generated so that messages having TTL values from one to at least N+1 are produced.

The flow analysis triggering software 4 on computer A formats the generated message 10 as well as the other generated messages (not shown) to include the monitoring request 11. In the present example, the request 11 is a Session Diagnostics STUN attribute included in the payload of the STUN request 10C.

The request 11 includes a flow identifier 11A that identifies the flow to be monitored. In the present example, the flow identifier 11A is a Globally Unique Call Identifier (GUCID). This and other fields or attributes included in the request 11 may be Type-Length-Value (TLV) formatted. Instead of or addition to the GUCID, the STUN username, which is a unique call identifier and already present in a normal ICE exchange, may be used to identify the flow.

The request 11 also includes a command field 11B that indicates attributes of the requested flow analysis such as the type of monitoring to be performed. For example, the command field 11B may request an analysis that includes counting packets in the call flow. In addition, the command field 11B may identify measurements to be conducted, such as inter-arrival jitter. The command field 11B may indicate that every packet in the identified call flow should be measured, or only a selected percentage of packets.

The request 11 also may include other monitoring attributes 11C. When a shortened flow analysis is requested that analyzes the call flow for only a portion of the duration of the call flow, these attributes 11C include a duration for the router 6 to conduct the monitoring. The attributes 11C may also include a flag requesting the remote endpoint to launch a traceroute. The attributes 11C may also indicate a Uniform Resource Locator (URL), which indicates a non-default location for posting the flow analysis results 13.

The generated messages including message 10 are transferred from computer A to the first hop router 6. The router 6 decrements the TTL values included in these messages just as the router 6 decrements TTL values of other incoming traffic. The router 6 forwards any messages having a decremented TTL value greater than zero along to a destination address. The message 10, however, has its TTL value decremented to zero, which indicates the lifetime has expired and elicits an Internet Control Message Protocol (ICMP) 12 error from router 6.

The router 6 is configured with the flowing monitoring initiation software 5 that is triggered to respond to an observation of a packet having an expired lifetime. The software 5 in router 6 observes the message 10 having the expired lifetime, and then causes the router 6 to further examine the message 10 for the monitoring request 11. In other words, rather than examining every incoming packet for the monitoring request 11 (which would require great quantities of hardware resources), the router 6 only examines messages having expired lifetimes. When the request 11 is formatted as a STUN message, the software 5 causes the router 6 to examine the message 10 by locating any session diagnostics attributes included in the STUN payload of the message 10.

When a different router (not shown) that does not include the software 5 receives one of the messages containing the monitoring request 11, the different router is not triggered to examine the message for the request 11. Accordingly, the different router without the software 5 simply forwards or drops the message, depending on the decremented lifetime value and without observing the request 11. As a result, the technique for triggering the monitoring by the router 6 does not compromise backwards compatibility for different routers that are not configured with the software 5.

Upon observing that the message 10 includes the monitoring request 11, the router 6 is triggered to begin monitoring the call flow according to the monitoring request 11. The router 6 may perform NetFlow monitoring on the call flow, or any other kind of monitoring. While it is possible that the router 6 may already be monitoring the flow according to some default monitoring, the router 6 still begins monitoring the call flow according to the monitoring request 11 that may be different from default monitoring performed by the router 6.

The router 6 generates flow analysis results 13 that may be stored on the router 6 for transfer to another network device such as a Network Management System (NMS), which may correlate the results 13 with results from other routers to identify the cause of the packet loss, delay, jitter, or other problem. When the monitoring request 11 includes the flow identifier 11A, the software 5 inserts the identifier 11A into the results 13 to assist in the correlation function.

In a similar fashion, other on-path routers having the software 5 are also triggered by a respective one of the generated messages to initiate flow analysis. Monitoring results from all the routers are then typically transferred to an NMS for aggregation and analysis. Using the aggregated results the NMS is able to identify the root cause of the packet loss or other problem.

Other embodiments include systems where calling endpoints transfer a monitoring request to a router in other types of communications besides those used for traceroutes. In these systems, the endpoints preferably include the monitoring request in a predetermined message format, which may be a message format corresponding to a communication that is not necessarily functionally equivalent to STUN. Then, software on the router is configured to do an initial check of every received packet to determine whether the received packet includes the predetermined message format. For packets identified as including the predetermined message format, the router does a more intensive check on the identified packets to determine whether they include the monitoring request. The intensive check is thus not required on packets not having the predetermined message format. The router then performs the monitoring according to the included monitoring request.

Still other embodiments include systems where calling endpoints transfer a monitoring request to a router in other types of communications besides those used for traceroutes and a predetermined message type is not included. The router in these systems can be configured to examine every incoming packet for the monitoring request. Like the other embodiments, such a system does not require NMS involvement to initiate or trigger the monitoring by the router.

Figure 2:
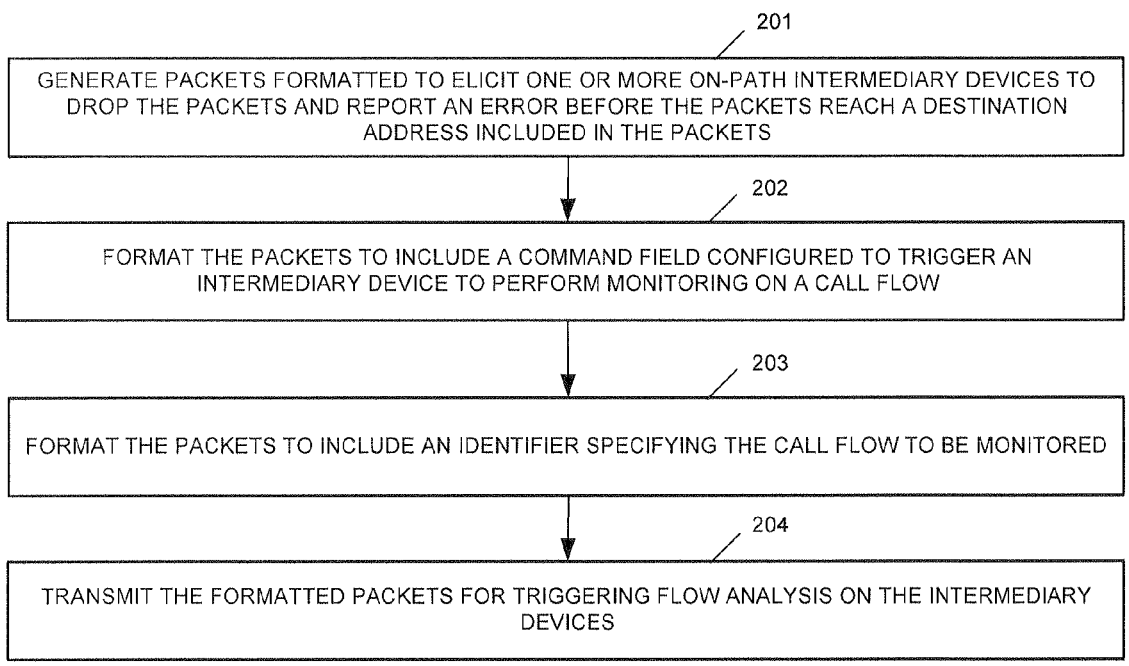
FIG. 2 illustrates an example method for using the computer illustrated in FIG. 1.

FIG. 2 illustrates an example method for using the computer illustrated in FIG. 1.

In block 201, the computer A generates packets formatted to elicit one or more on-path intermediary devices to drop the packets and report an error before the packets reach a destination address included in the packets. These packets may comprise a portion of a traceroute, or merely may be configured to reach an expired lifetime before reaching a destination address. The computer A formats the packets to include a command field configured to trigger an intermediary device to perform monitoring on a call flow in block 202. In block 203, the computer A formats the packets to include an identifier specifying the call flow to be monitored. In block 204, the computer A transmits the formatted packets for triggering flow analysis on the intermediary devices.

Figure 3:
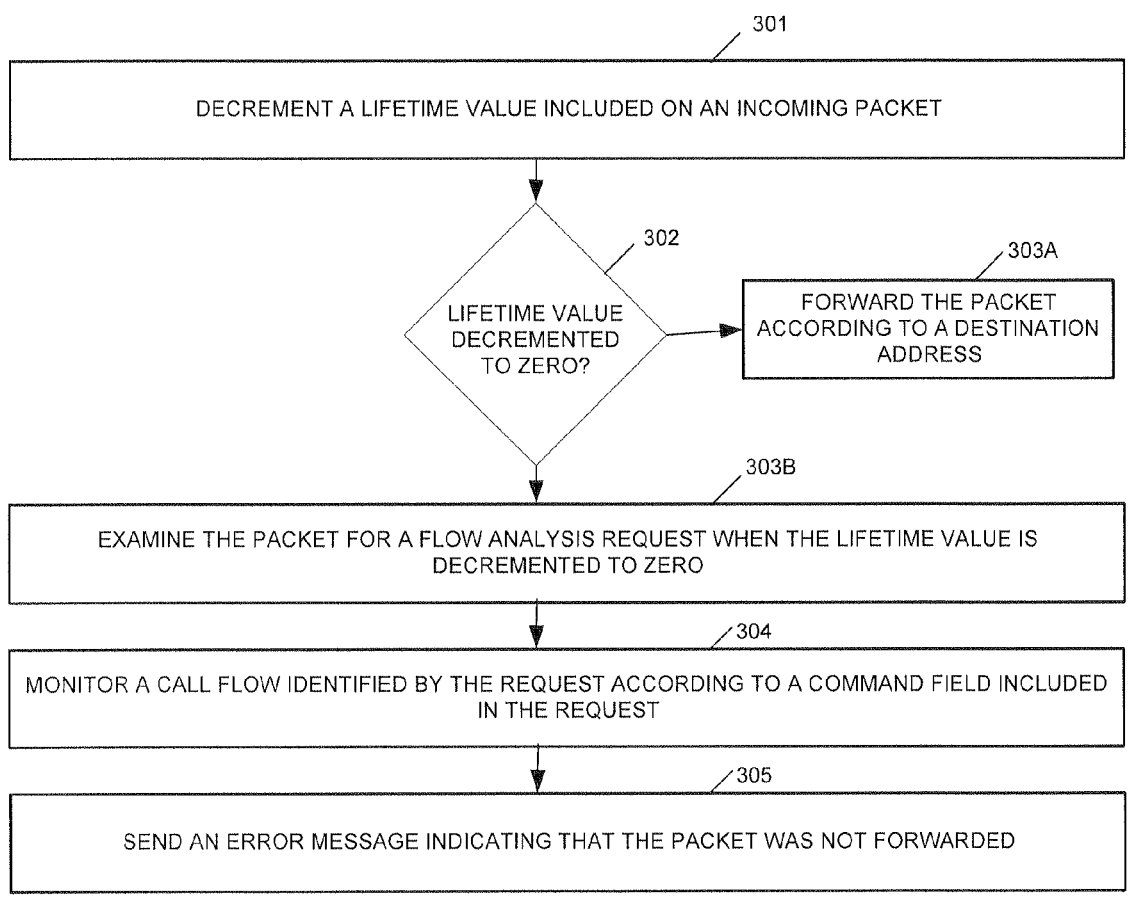
FIG. 3 illustrates an example method for using the router illustrated in FIG. 1

FIG. 3 illustrates an example method for using the router illustrated in FIG. 1

In block 301, the router 6 decrements a lifetime value included on an incoming packet. The router 6 determines whether the lifetime value is decremented to zero (or whether the packet otherwise indicates that it should be dropped and not forwarded) in block 302. In block 303A, the router 6 forwards the packet according to a destination address when the packet lifetime has not expired.

In block 303B, when the decremented lifetime value is equal to zero, the router 6 examines the packet for a flow analysis request. If a flow analysis request is present, router 6 then monitors a call flow identified by the request according to a command field included in the request in block 304. In block 305, the router 6 sends an error message indicating that the packet was not forwarded.

The above examples describe a computer triggering monitoring on intermediary devices. In other examples, other endpoints such as a personal computer, an IP phone, a Personal Digital Assistant (PDA), a cell phone, a smart phone, a Publicly Switched Telephone Network (PSTN) gateway, etc., may trigger the remote monitoring on any network device.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
   processing circuitry; and
   a memory coupled to the processing circuitry comprising instructions executable by the processing circuitry, the processing circuitry operable when executing the instructions to:
   decrement lifetime values of incoming packets before performing a forwarding function;
   filter the packets according to whether they are expired or not by analyzing the decremented lifetime values;
   examine only the filtered packets having the exceeded lifetime for a monitoring request, wherein the processing circuitry does not conduct the monitoring request examination for the non-expired packets;
   if the monitoring request is located in an expired one the packets according to the examination, extract a call flow identifier from the monitoring request;
   compare the extracted call flow identifier to received call flows to identify any call flows corresponding to the extracted call flow identifier; and
   conduct an ongoing monitoring of any identified call flows, said ongoing call flow monitoring performed according to any monitoring parameters included in the monitoring request and, said ongoing call flow monitoring including at least one selected from the group including counting packets in the call flow and measuring inter-arrival jitter of the call flow packets.

2. The apparatus of claim 1, wherein the examined packets correspond to a traceroute initiated by an endpoint for the call flow.

3. The apparatus of claim 1, wherein the monitoring request is located in a payload of an address request message.

4. The apparatus of claim 1, wherein the processing circuitry is further operable to insert the call flow identifier into locally generated monitoring results.

5. The apparatus of claim 1, wherein the processing circuitry is further operable to send an error message usable by an endpoint to discover the presence of a router located on a call path.

6. An apparatus, comprising:
   processing circuitry; and
   a memory coupled to the processing circuitry comprising instructions executable by the processing circuitry, the processing circuitry operable when executing the instructions to:
   perform an initial inspection of incoming packets to identify those ones of the incoming packets that are expired;
   perform a subsequent inspection only on the expired packets to locate any triggers included therein for initiating data streams analysis;
   analyze received data streams to identify any data streams corresponding to the triggers from the expired packets; and
   if any data streams are identified, initiate an analysis of the identified data streams according to the corresponding triggers from the expired packets;
   wherein the triggers are included in payloads of Simple Traversal of User Datagram Protocol (UDP) Through Network Address Translators (NATs) (STUN) requests.

7. The apparatus of claim 6, wherein only those ones of the packets that have exceeded lifetimes and that are to be dropped without forwarding receive the subsequent inspection.

8. The apparatus of claim 6 wherein the processing circuitry is configured to, if the corresponding trigger from the expired packet includes a Universal Resource Location (URL), store results of the data stream analysis in a non-default location.

9. The apparatus of claim 6, wherein the data streams associated with the analysis are selected to correspond with identifiers included in the triggers.

10. An apparatus, comprising:
    processing circuitry; and
    a memory coupled to the processing circuitry comprising instructions executable by the processing circuitry, the processing circuitry operable when executing the instructions to:
    perform an initial inspection of incoming packets to identify those ones of the incoming packets that are expired;
    perform a subsequent inspection only on the expired packets to locate any triggers included in payloads of Simple Traversal of User Datagram Protocol (UDP) Through Network Address Translators (NATs) (STUN) requests, the triggers for initiating data stream analysis;

analyze received data streams to identify any data streams corresponding to the triggers from the expired packets; and if any data streams are identified, initiate an analysis of the identified data streams according to the corresponding trigger from the expired packet;

wherein the data streams associated with the analysis are selected to correspond with an identifier included in the expired packets; and wherein the initiated analysis is different than any default packet flow analysis performed on the data streams before the initiated analysis begins.

11. An apparatus, comprising:

means for generating a plurality of trace packets formatted to elicit a plurality of on-path intermediary devices to drop the packets and report an error before the packets reach a destination address included in the packets;

means for inserting Simple Traversal of User Datagram Protocol (UDP) Through Network Address Translators (NATs) (STUN) requests into the trace packets; and means for inserting a monitoring request into payloads of the STUN requests, the monitoring request formatted to trigger the on-path intermediary devices to initiate call flow monitoring, the monitoring request including an identifier to be used by the on-path intermediary devices to select amongst received call flows and perform the monitoring on only the selected flow or flows.

12. The apparatus of claim 11, wherein the packets include a request for a remote endpoint to send back a STUN response.

13. The apparatus of claim 11, further comprising means for formatting the monitoring request to specify an inter-arrival jitter analysis.

14. The apparatus of claim 11, wherein the packets comprise a portion of a traceroute.

15. The apparatus of claim 14, wherein the traceroute is a Real Time Protocol (RTP) traceroute.

16. The apparatus of claim 11, wherein each of the packets are formatted to achieve a different amount of network hops prior to being dropped.

17. The apparatus of claim 11, wherein each of the packets are formatted to initiate monitoring on a different respective one of the on-path intermediary devices that drops the packet.

18. The apparatus of claim 6, wherein the data stream analysis includes at least one selected from the group including counting packets in the data streams and measuring inter-arrival jitter of the data stream packets.

19. The apparatus of claim 18, wherein the data stream analysis is continuous for a duration specified in the identified packets.

20. The apparatus of claim 10, wherein the data stream analysis includes at least one selected from the group including counting packets in the data streams and measuring inter-arrival jitter of the data stream packets.

21. The apparatus of claim 11, wherein the call flow monitoring to be initiated by the on-path intermediary devices includes at least one selected from the group including counting packets in data streams and measuring inter-arrival jitter of the data stream packets.

* * * * *